United States Patent
Wike, Jr. et al.

(10) Patent No.: US 7,389,918 B2
(45) Date of Patent: Jun. 24, 2008

(54) AUTOMATIC ELECTRONIC ARTICLE SURVEILLANCE FOR SELF-CHECKOUT

(75) Inventors: Charles K. Wike, Jr., Sugar Hill, GA (US); Robert L. Snyder, Suwanee, GA (US); Alfred John Hutcheon, Tayside (GB); Daniel F. James, Buford, GA (US); Paul F. Nugent, Jr., Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 1019 days.

(21) Appl. No.: 10/001,389

(22) Filed: Oct. 23, 2001

(65) Prior Publication Data

US 2003/0075602 A1     Apr. 24, 2003

(51) Int. Cl.
*G06K 15/00*     (2006.01)

(52) U.S. Cl. .......................................... 235/383; 705/16

(58) Field of Classification Search ................. 235/383, 235/375, 487, 462.13, 462.31; 705/16, 18; 340/572.1, 572.3
See application file for complete search history.

(56) References Cited

U.S. PATENT DOCUMENTS

| | | | | |
|---|---|---|---|---|
| 3,938,044 A | * | 2/1976 | Lichtblau | 340/572.3 |
| 4,063,229 A | * | 12/1977 | Welsh et al. | 340/571 |
| 4,141,078 A | | 2/1979 | Bridges, Jr. et al. | |
| 4,574,274 A | * | 3/1986 | Pinneo | 340/572.3 |
| 4,575,624 A | | 3/1986 | Klinkhardt | |
| 4,728,938 A | * | 3/1988 | Kaltner | 340/572.3 |
| 5,029,291 A | * | 7/1991 | Zhou et al. | 340/551 |
| 5,059,951 A | * | 10/1991 | Kaltner | 340/572.3 |
| 5,126,720 A | * | 6/1992 | Zhou et al. | 335/284 |
| 5,341,125 A | * | 8/1994 | Plonsky et al. | 340/572.3 |
| 5,469,142 A | * | 11/1995 | Bergman et al. | 340/572.3 |
| 5,594,228 A | * | 1/1997 | Swartz et al. | 235/383 |
| 5,705,986 A | * | 1/1998 | Zschirnt | 340/572.3 |
| 5,814,799 A | * | 9/1998 | Swartz et al. | 235/383 |
| 6,102,290 A | * | 8/2000 | Swartz et al. | 235/462.01 |
| 6,154,135 A | * | 11/2000 | Kane et al. | 340/572.3 |
| 6,155,486 A | * | 12/2000 | Lutz | 235/383 |
| 6,158,662 A | * | 12/2000 | Kahn et al. | 235/472.01 |
| 6,169,483 B1 | * | 1/2001 | Ghaffari et al. | 340/572.3 |
| 6,234,394 B1 | * | 5/2001 | Kahn et al. | 235/462.46 |
| 6,281,796 B1 | * | 8/2001 | Canipe et al. | 340/572.3 |
| 6,333,692 B1 | * | 12/2001 | Andersen et al. | 340/572.1 |
| 6,486,780 B1 | * | 11/2002 | Garber et al. | 340/572.1 |
| 6,497,361 B1 | * | 12/2002 | Mason | 235/383 |

(Continued)

FOREIGN PATENT DOCUMENTS

EP     0372716 A     6/1990

(Continued)

*Primary Examiner*—Uyen-Chau N Le
(74) *Attorney, Agent, or Firm*—Maginot, Moore & Beck LLP (57) ABSTRACT

A self checkout system/terminal includes an electronic article surveillance (EAS) system. The EAS system includes an EAS detector and an EAS deactivator. EAS tag detection is associated with a purchase transaction event, such as scanning or bagging of an item. After EAS tag detection, the customer is directed to deactivate the EAS tag. Some of the self-service checkout terminal (SCOT) operation/functionality may be paused during an EAS tag deactivation period. The subject EAS system and/or process eliminates the need to deactivate every item, thereby streamlining the self checkout process when EAS is used in a store.

22 Claims, 7 Drawing Sheets

U.S. PATENT DOCUMENTS

| | | | |
|---|---|---|---|
| 6,507,279 B2 * | 1/2003 | Loof | 340/572.1 |
| 6,598,791 B2 * | 7/2003 | Bellis et al. | 235/383 |
| 6,719,202 B1 * | 4/2004 | Kawai et al. | 235/462.13 |
| 6,788,205 B1 * | 9/2004 | Mason et al. | 340/572.3 |
| 6,837,436 B2 * | 1/2005 | Swartz et al. | 235/472.02 |
| 6,857,567 B2 * | 2/2005 | Latimer et al. | 235/383 |
| 6,942,145 B1 * | 9/2005 | Collins et al. | 235/383 |
| 2002/0096564 A1 * | 7/2002 | Bellis et al. | 235/383 |
| 2002/0123932 A1 * | 9/2002 | Brenhouse | 705/16 |
| 2003/0018897 A1 * | 1/2003 | Bellis, Jr. et al. | 713/182 |

FOREIGN PATENT DOCUMENTS

| | | |
|---|---|---|
| EP | 994447 A2 * | 4/2000 |
| NL | 8700737 A | 10/1988 |
| WO | WO 85/02285 | 5/1985 |
| WO | WO 99/53435 A | 10/1999 |
| WO | WO 02/071346 A | 9/2002 |

* cited by examiner

AUTOMATIC ELECTRONIC ARTICLE SURVEILLANCE FOR SELF-CHECKOUT

BACKGROUND

1. Field of the Invention

The present invention relates generally to self-service checkout systems for retail businesses and, more particularly, to a self-service checkout system having an automatic electronic article surveillance system.

2. Background Information

Many general merchandise stores and an increasing number of retail grocery, supermarket, or food stores utilize electronic article surveillance (EAS) techniques to monitor, deter, and/or prevent article theft. EAS technology typically utilizes a tag or the like that is applied to an article and a sensor designed to detect the tag when the tag is proximate the sensor. The sensor is typically placed at or near an exit and provides a response when a tag is brought proximate the sensor. A deactivator is used to deactivate a tag such that the sensor will not respond when a deactivated tag is brought proximate the sensor.

The tag deactivation procedure is typically based on having a trained operator in an assisted service environment. Particularly, a trained operator either removes the tag or utilizes the deactivator on the tag to deactivate the tag. This is accomplished during or immediately after the purchase transaction. Thus, once payment has been received for the item, the tag will not set off the sensor.

EAS technology consists of two primary types. The most currently popular type is manufactured by Sensormatic Electronics Corporation of Boca Raton, Fla. 33431 (Sensormatic). The Sensormatic EAS is based on magnetic technology and requires relatively large tags and correspondingly large deactivation equipment.

Current or conventional implementation of the magnetic technology EAS in self-service checkout or self checkout involves placing a deactivator or deactivator block directly inline with a scanning and bagging portion or operation of the self checkout. Since the deactivator is large and heavy, placement of the deactivator directly inline with the scanning and bagging operation is an impediment to the essential functions of scanning and bagging, thereby causing a decrease in efficiency, adding time to the self checkout procedure, and consequently causing customer dissatisfaction.

Figure 1:
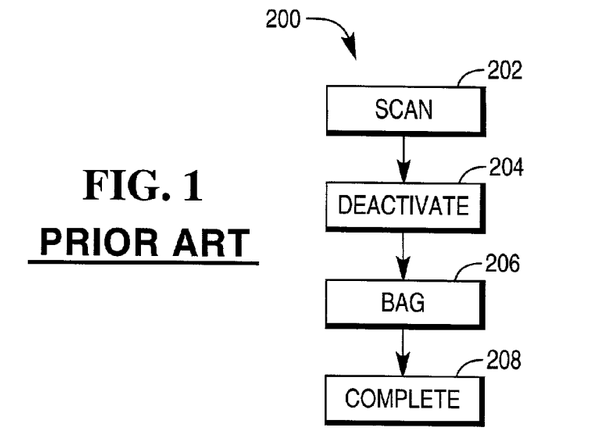
FIG. 1 is a flow chart of a prior art manner of operation of a self checkout having an electronic article surveillance detector and deactivator.

The conventional method of implementation in a self checkout is illustrated in FIG. 1 and is thus labeled "prior art". The conventional method of implementation in a self checkout is illustrated in FIG. 1 as a flowchart, generally designated 200. In step 202, a customer scans an item. The item may or may not include an EAS tag. In step 204, a deactivator is either activated to deactivate an EAS tag after the scanning process regardless of whether the item has an EAS tag or the deactivator is always on to deactivate an EAS tag regardless of whether the item has an EAS tag. In step 206, the item is then bagged. A weighing process may be associated with the bagging of the item. After the bagging process, in step 208, the purchase transaction is completed. It should be appreciated that should there be more than one item, the scan, deactivation and bagging of each item is accomplished in the above manner before the completion of the purchase transaction.

In the event that an EAS tag is not properly deactivated through the scanning and bagging process, the customer will be stopped at the store exit by a store employee when a notification alert (such as a loud noise) is provided by the sensor. A store employee will either have to allow the customer to pass knowing they have an activated EAS tag (assuming the store employee knows that the item to which the EAS tag is associated, has been properly paid for) or the store employee will have to deactivate the item to which the EAS tag is associated. In the case of multiple items with EAS tags, each tag will need to be deactivated by the store employee.

The above nuisance of non-deactivation or underdeactivation of EAS tags has been addressed by increasing the magnetic field strength of the deactivator. This solution however, can result in damage to other magnetic media (i.e. non-EAS tags) such as credit and/or debit cards, VCR tapes, cassette tapes, and/or the like. Because of the above-noted consequences, increasing the magnetic field strength of the deactivator is not desirable.

It would thus be advantageous to have prior knowledge of which items have been tagged with an EAS tag and provide an alert to the customer when an item having such a tag is scanned and then direct the customer to deactivate the EAS tag. In this manner, the EAS deactivator may be remotely located from the scanning and bagging operation. One manner in which the self checkout or store can have prior knowledge of which items have been tagged with an EAS tag is to correlate the EAS tag with the item's Uniform Product Code (UPC) that now allow the lookup of price and weight information. This solution, however, requires another database or database entry and the requirement of accurate correlating information. Additionally, stores traditionally do not compile and/or maintain such data.

What is therefore needed is a self-service checkout system that overcomes one or more of the above-mentioned drawbacks. What is particularly needed is a self-service checkout system that implements EAS technology in a more effective manner than the prior art.

What is further needed is a self-service checkout system that utilizes EAS technology in a more efficient manner than the prior art.

SUMMARY

The subject invention is a self-service checkout having an automatic EAS detector and a method of self checkout utilizing automatic EAS detection.

In accordance with an aspect of the subject invention, there is provided a method of operating a self checkout terminal. The method includes the steps of (a) allowing scanning of an item for purchase via a scanner, (b) determining whether the item has an active electronic article surveillance tag, and (c) allowing deactivation of the active electronic article surveillance tag when it is determined that the item includes an electronic article surveillance tag.

In accordance with another aspect of the subject invention, there is provided a self checkout terminal. The self-service checkout terminal includes a scanner, an electronic article surveillance detector, and an electronic article surveillance deactivator. The scanner is operative to scan an item. The electronic article surveillance detector is operative to detect whether a scanned item has an active electronic article surveillance tag. The electronic article surveillance deactivator is operative to deactivate the active electronic article surveillance tag when it is determined by the electronic article surveillance detector that a scanned item has an active electronic article surveillance tag.

In accordance with yet another aspect of the subject invention, there is provided a self checkout system. The self checkout system includes a processor, a scanner in communication with the processor, an electronic article surveillance detector in communication with the processor, and an electronic article surveillance deactivator. The self checkout system further includes memory in communication with the processor and storing program instructions which, when executed by the processor, causes the processor to: (a) allow scanning of an item for purchase via the scanner, (b) determine whether the item has an active electronic article surveillance tag via the electronic article surveillance detector, and (c) allow deactivation of the active electronic article surveillance tag when it is determined that the item includes an electronic article surveillance tag.

It is therefore an object of the subject invention to provide a new and useful self-service checkout system.

It is moreover an object of the subject invention to provide an improved self-service checkout system.

It is a further object of the subject invention to provide a new and useful method of operating a self-service checkout system.

It is moreover an object of the subject invention to provide an improved method of operating a self-service checkout system.

It is yet another object of the subject invention to provide a low-cost, easy to implement EAS monitoring system and method thereof in a self-service checkout system.

It is moreover an object of the subject invention to provide a low-cost, easy to implement EAS detection and deactivation system and method thereof in a self-service checkout system.

The above and other objects, features, and advantages of the subject invention will become apparent from the following description and the attached drawings.

BRIEF DESCRIPTION OF THE DRAWINGS

Corresponding reference characters indicate corresponding parts throughout the several views.

DETAILED DESCRIPTION OF THE INVENTION

Figure 2:
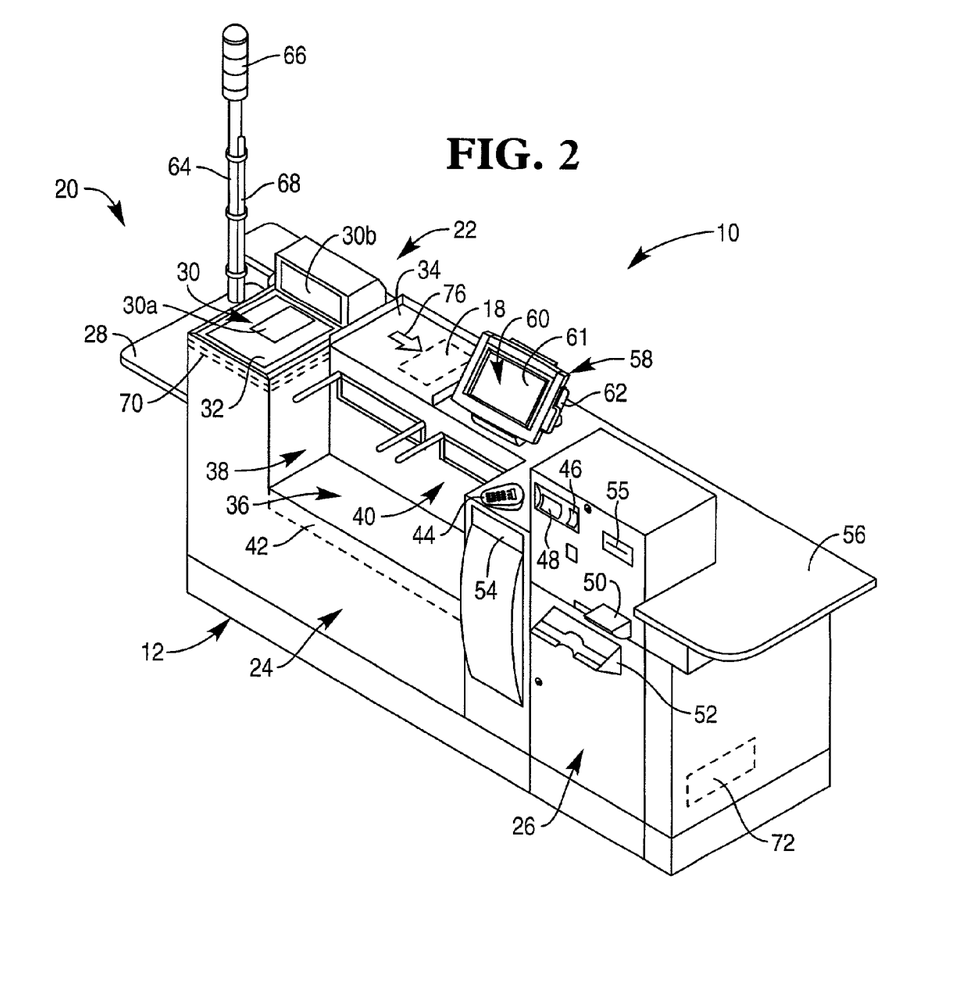
FIG. 2 is a perspective view of an exemplary self checkout embodying the subject invention.

Referring to FIG. 2, there is depicted a self-service checkout or self checkout system generally designated 10 in which the subject invention is utilized. The self-service checkout system 10 includes a self-service checkout terminal or self-checkout terminal (SCOT) 12. Typically the self-service checkout system 10 is within a retail store such as a grocery store. In the present case, the SCOT 12 is within a store that utilizes electronic article surveillance (EAS). It should be appreciated that EAS, as used herein, encompasses all types of EAS technology such as magnetic, passive and active transponder, and the like. The subject invention, however, will be described in connection with magnetic EAS, but it should be appreciated that all other types of EAS may be used, as the principles of the present invention are the same.

In accordance with an aspect of the subject invention, the SCOT 12 is operative to monitor purchase transactions being performed or conducted at the SCOT 12 by the consumer. Particularly, the SCOT 12 is operative to utilize EAS monitoring of the purchase transaction such that the SCOT 12 may detect whether an item or article being purchased by the consumer has an EAS tag, marker, label, sticker, or the like (hereinafter collectively "tag"). More particularly, the SCOT 12 is operative to utilize an EAS detector to sense, detect, and/or ascertain whether an item has an EAS tag associated therewith and then allow the consumer to deactivate the EAS tag with an EAS deactivator. This may be done during or after an item has been scanned, or during or after the scanned item is bagged. The EAS deactivator is preferably provided remote from the scanner and bagging area. The EAS deactivator may always be on in the case of a passive EAS deactivator. Alternatively, the EAS deactivator may be always on when the deactivator is an active device. Preferably, however, the EAS deactivator is only on when it is determined that an item has an EAS tag (which assumes that the EAS deactivator is an active device).

The SCOT 12 is configured to perform a number of retail functions such as unassisted or "self-service" checkout functions. What is meant herein by the term "self-service checkout functions" or "self-service checkout transaction" or "self-service purchase transaction" are those checkout functions or transactions that are performed by a checkout system by the customer himself or herself without the assistance of a clerk or other personnel employed by the retailer. For example, a self-service checkout (purchase) function or transaction would be performed on the SCOT 12 in response to a customer himself or herself scanning or otherwise entering items for purchase into the checkout system, and thereafter depressing a payment key on the checkout system that indicates the manner by which the customer intends to pay for such items (e.g. by interaction with a credit/debit card reader or currency acceptor). Accordingly, what is meant herein by the phrase "self-service mode of operation" is a configuration of the SCOT 12 that allows the system 12 to perform a self-service checkout (purchase) function or transaction.

In addition, what is meant herein by the term "customer" or "consumer" (in the context of the subject invention) is a person who enters a retailer's store, selects his or her items for purchase from the shopping area of the store, checks out his or her items for purchase at a checkout system such as the SCOT 12 (including tendering payment for his or her items for purchase), and then exits the store subsequent to tendering payment. Hence, as used herein, a customer or consumer is distinguished from retail personnel such as a checkout clerk or other employee of the retailer in that a customer or consumer enters the retailer's store 18 for the purpose of purchase items from the store. Moreover, what is meant herein by the term "retail personnel" is a person that is employed by the retailer to perform a retail activity such as operation of the monitoring station 14 or assistance in operation or other function of the SCOT 12. Also, the term "user" is herein used to refer to any operator of the SCOT 12. Accordingly, a user may be a retail personnel, a customer or consumer, or any other person who operates the SCOT 12.

The SCOT 12 includes a pre-scan area 20, an itemization area 22, a bagging area 24, a payment area 26, and an EAS deactivation area 18. The pre-scan area 20 includes a shelf 28 on which a customer may place a shopping basket (not shown) or items for eventual scanning. In particular, the pre-scan area 20 provides a place where the customer can place items for purchase before scanning. It should be appreciated that the shelf 28 is only representative of a pre-scan area wherein a customer may place items for purchase.

The itemization area 22 of the SCOT 12 includes a scanner 30 and a product scale 32. The scanner 30 conventionally scans or reads a product identification code such as a Universal Product Code (UPC), industrial symbol(s), alphanumeric character(s), or other indicia associated with an item to be purchased. One scanner that may be used in the subject invention is a model number 7875 bi-optic scanner that is commercially available from NCR Corporation of Dayton, Ohio.

The scanner 30 includes a first scanning window 30a and a second scanning window 30b. The first scanning window 30a is disposed in a substantially horizontal manner, whereas the second scanning window 30b is disposed in a substantially vertical manner. The horizontal or first scanning window 30a is disposed in a relatively flush-mount arrangement with the product scale 32 such that the product scale 32 is integrated with the scanner 30. If an item such as produce is placed upon the product scale 32 or the first scanning window 30a, the product scale 32 may be used to determine the weight of the produce (item).

The scanner 30 includes a light source (not shown) such as a laser, a rotating mirror (not shown) driven by a motor (not shown), and a mirror array (not shown) such as is conventional in the art. In operation, a laser beam from the laser reflects off the rotating mirror and mirror array to produce a pattern of scanning light beams. As the product identification code on an item is passed over in front of the scanner 30, the scanning light beams scatter off the product identification code and are returned to the scanner 30 where they are collected and detected. The reflected light is then analyzed electronically in order to determine whether the reflected light contains a valid code pattern. If a valid code pattern is detected or present, the product identification code may then be utilized to retrieve product information associated with the item (e.g. the price of the item, product description, or the like).

In accordance with an aspect of the present invention, an EAS detector 70 is provided proximate the scanner 30. In FIG. 2, the EAS detector 70 is disposed around the product scale 32 and the first scanning window 30a. Alternatively, but not shown, the EAS detector 70 may be disposed around the second scanning window 30b. In particular, one embodiment provides an EAS detector at the itemization area 22. The EAS detector 70 is operative to monitor, sense or detect an EAS tag on an item that is being scanned. Particularly, the EAS detector 70 is operative to detect whether an item that is being scanned has an EAS tag associated therewith.

In one form, the EAS detector 70 is a coil that is adapted/operative to sense an EAS tag. The coil is operative through appropriate electrical circuitry/logic to magnetically detect a magnetically responsive EAS tag. Thus, when the EAS tag is within the magnetic field of the coil, the electrical characteristics/response of the coil will change thereby indicating that an item being scanned has an EAS tag. When an EAS tag has been detected by the EAS detector 70, the SCOT 12 may not allow further scanning of items until the EAS tag has been deactivated. Deactivation of the EAS tag will be described below.

The itemization area 22 also includes a post-scanning or set-aside area or shelf 34 on which a customer may place items before being bagged as described below in conjunction with the bagging area 24. An EAS or security deactivation area, device or deactivator 18 is provided at the set-aside shelf 34. The EAS deactivation device 18 is operative to deactivate or otherwise disable EAS or security tags associated with an electronic article surveillance (EAS) system. In particular, certain items sold by the retailer may have an electronic or magnetic (EAS) tag secured thereto. Such EAS tags are generally a label or "clip-on" mechanism that has an electronic transponder (active or passive) or magnetic device, imbedded therein that triggers an alarm if the item is taken from the retailer's store without the tag being deactivated or otherwise disabled beforehand. The security deactivation device 18 is utilized to deactivate such electronic tags after scanning.

The set-aside shelf 34 is preferably made of a medium that is magnetically and/or electrically transparent such that the EAS tag may be deactivated. One such medium or material is a polycarbonate. Of course, it should be appreciated that the EAS deactivator 18 may be provided at another location on the SCOT 12. Any other location, however, should be convenient for the customer to use.

The set-aside shelf 34 may also include a media entry indicator, markings or indicia 76 to direct the consumer to the appropriate area for deactivating the EAS tag. The indicia 76 may be passive or active. A passive indicia 76 would be a label or the like with or without writing indicating the deactivation area. An active indicia 76 would be a light or the like that would be turned on when an EAS tag is detected by the EAS detector 70. The lighted indicia 76 could flash or otherwise direct the attention of the consumer to the deactivation area 18. A sound may also be provided as an extra indication that an EAS tag has been detected and therefore needs to be deactivated. The area over the EAS deactivator 18 may be clear (transparent) to delineate the deactivation area (the area in which an EAS tag will be deactivated by the EAS deactivator 18). Further, the EAS deactivator 18 may always be on, or it may only be turned on or operative when an EAS tag has been detected by the EAS detector 70.

The bagging area 24 includes a bagwell 36 that is of sufficient size to accommodate a first bag holder/bagging area 38 and a second bag holder/bagging area 40. The first and second bag holder/bagging areas 38 and 40 each are adapted to retain a plurality of paper and/or plastic bags (not shown) for holding scanned items to be purchased. The bagwell 36 is configured such that a bag and its contents (items scanned for purchase) rest upon a security scale 42. The security scale 42 is a weight scale that monitors the weight of items placed into a bag located in the bagwell 36. Such monitoring during a checkout transaction is particularly useful to prevent improprieties during the checkout transaction.

Particularly, the security scale 42 is utilized to monitor the ingress and egress of items into and out of the bagging area 24. More particularly, the security scale 42 is utilized to detect placement of items into and out of the bagwell 36. Such item movement monitoring may be utilized to determine if the customer is unintentionally or intentionally committing an impropriety such as theft. For example, a control signal is generated when the scanner 30 successfully captures a product code associated with an item being entered into the SCOT 12. The security scale 42 may be used to detect placement of an item into the bagging area 24 before being scanned by the scanner 30 in the itemization area 22. Moreover, when an item is scanned with the scanner 30 and thereafter placed into a bag in the bagwell 36, the detected weight of the item (as detected by the security scale 42) may be compared to a known weight value of the item that is stored in a database in order to confirm that a different, more expensive item was not substituted for the scanned item. It should be appreciated that the database may be in the form of a master database that includes every item sold by the retailer, or may be a "transaction level" database that is constructed locally at the SCOT 12 during operation thereof.

The SCOT 12 also includes a user interface terminal for receiving input from and providing information to a customer. In particular, the SCOT 12 includes an interactive customer interface terminal 58. The interactive customer interface terminal 58 includes a display monitor 60 that is provided to display retail information to the customer during operation of the SCOT 12. For example, transaction information such as item price, item description, total amount of the transaction, instructions, etc. is displayed to the customer via the display monitor 60 during operation of the SCOT 12. Moreover, instructions are displayed on the display monitor 60 that assist or otherwise guide the customer through operation of the SCOT 12.

Additionally, customer-specific messages may be displayed to the customer on the display monitor 60 at certain times during a checkout transaction. What is meant herein by the term "customer-specific" in regard to messages is a retail message that is customized for a given customer based on the purchasing habits or other information that is unique to the customer. For example, a customer-specific message may include a customer-specific advertisement that advertises a product that was purchased by the customer during a previous visit to the retailer's store. The SCOT 12 is configured to retrieve information from a customer profile database that contains information about each of the retailer's customers. Moreover, a customer-specific message may include a customer-specific advertisement that advertises a product that may be used in conjunction with a product that was previously scanned or otherwise entered into the SCOT 12 during the current checkout transaction. As well, the customer-specific message may indicate that the customer needs to deactivate a detected EAS tag.

The display monitor 60 of the interactive customer interface terminal 58 preferably incorporates a known touch screen monitor 61 that can generate data signals when certain areas of the screen are touched by a customer. Hence, the display monitor 60 may be utilized by the customer to input information into the SCOT 12. For example, the customer may manually enter retail information such as item codes and quantities into the SCOT 12 by use of the touch screen 61 associated with the display monitor 60. The customer may indicate his or her preferred method of payment (e.g. cash, credit card, or debit card) by touching the appropriate area of the touch screen 61 associated with the display monitor 60. A portion of the touch screen 61 associated with the display monitor 60 may also be used as a signature capture area wherein a stylus 62 is used to input a customer's signature in the case of a credit card purchase or other type purchase requiring a signature.

The payment area 26 of the SCOT 12 includes the system components necessary to allow a customer to perform retail finalization functions such as tendering payment for his or her items for purchase and printing of purchase transaction receipts. In particular, the payment area 26 of the SCOT 12 includes an electronic payment terminal 44 having a card reader and keypad, a pair of currency acceptors such as a coin acceptor 46 and a bill acceptor 50, a corresponding pair of currency dispensers such as a coin dispenser 48 and a bill dispenser 52, and a receipt printer 54. As shown in FIG. 1, the system components associated with the payment area 26 are positioned to face the customer.

The system components associated with the payment area 26 of the SCOT 12 are provided to allow the customer to tender payment for his or her items for purchase. In particular, once the customer has entered all of his or her items for purchase into the checkout terminal 10 during a self-service checkout/purchase transaction, the components associated with the payment area 26 are utilized to complete the self-service checkout/purchase transaction by (1) allowing payment to be tendered by either insertion of currency into a currency acceptor (i.e. the coin acceptor 46 and/or the bill acceptor 50), charging a credit card or debit card account, or decreasing a value amount stored on a smart card, cash card, or gift certificate card via the electronic payment terminal 44, and (2) printing a purchase transaction receipt with the receipt printer 54. In the case of when a customer inserts currency into the coin acceptor 46 and/or the bill acceptor 50, the SCOT 12 may provide change via the coin dispenser 48 and/or the bill dispenser 52. The payment area 26 also includes a coupon acceptor 55 that is adapted to receive coupons. The coupon acceptor 55 is operative to read indicia on a coupon to determine if the coupon has expired, the amount, and to correlate whether an item corresponding to the coupon has been scanned for purchase. At the end of the payment area is a set-aside shelf 56. The set-aside shelf 56 may be used for various purposes such as putting aside bread before placing the same into a bag until the bag is essentially full with heavy items. As well, but not shown, the set-aside shelf 56 may incorporate the EAS deactivator as shown associated with the set-aside shelf 34.

The SCOT 12 also includes an accessory pole 65 that supports a status light device 66, and an antenna/paging device 68. The status light device 66 may also support a camera (not shown). The status light device 66 and the antenna/paging device 68 are provided in order to notify store personnel, such as a customer service manager, if intervention into the current checkout transaction is needed. In particular, if during operation of the SCOT 12, an intervention-needed activity is detected, the status light device 66 and/or the antenna/paging device 68 are operated so as to summon retail personnel, such as the customer service manager. What is meant herein by the term "intervention-needed activity" is (1) activity by the customer or retail personnel in which the SCOT 12 is unintentionally operated improperly, (2) activity by the customer or retail personnel in which it can be inferred with a high degree of confidence that the SCOT 12 is intentionally operated improperly for illicit purposes such as theft, (3) activity by the customer or retail personnel in which the customer or retail personnel operates an input device associated with the SCOT 12 in a manner that indicates the he or she is in need of assistance, (4) activity by the components associated with the SCOT 12 that has rendered the system in need of maintenance or other type of service, and (5) an EAS tag that has not or can not be properly deactivated.

An intervention-needed activity may take the form of a security-breach activity in which the SCOT 12 is being operated in a manner that is placing the retailer in a position of potential financial loss due to goods being taken from the store without having first been paid for (either intentionally or unintentionally), less than all the goods being weighed in the case of produce that results in a false total price for the produce, or a non-security-breach activity in which the customer is in need of assistance or the SCOT 12 is in need of maintenance, but wherein the retailer is not at risk of financial loss due to goods being taken from the store without having been paid for first. The SCOT 12 may also have a video monitoring system (not shown).

Figure 3:
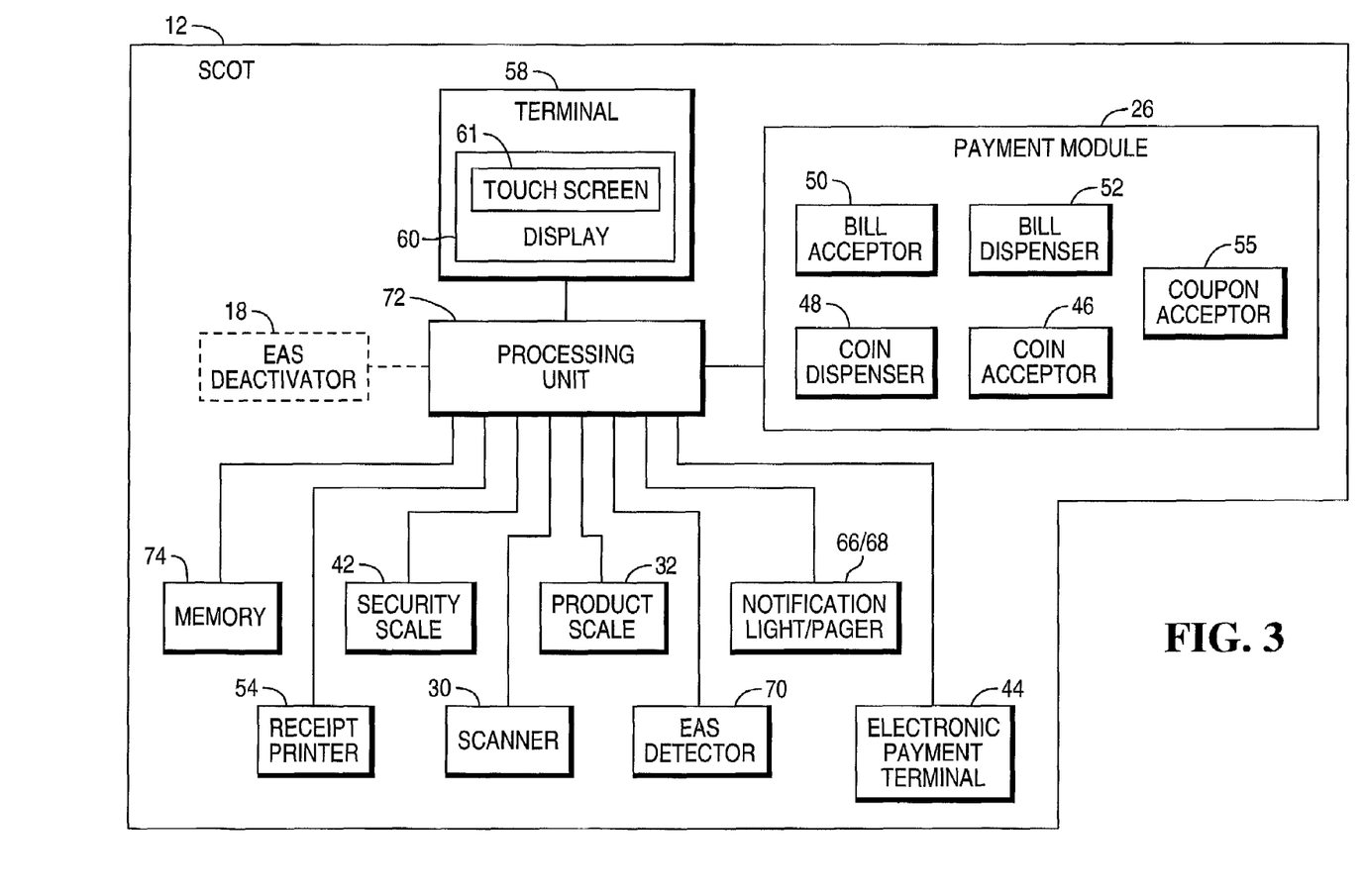
FIG. 3 is a block diagram of the exemplary self checkout of FIG. 2 in accordance with the principles of the subject invention.

Referring to FIG. 3, the SCOT 12 is shown in block diagram form. The processing unit or processor 72 of the SCOT 12 is in communication with the payment module 26. The payment module 26 encompasses the bill acceptor 50, the bill dispenser 52, the coin acceptor 46, the coin dispenser 48, and the coupon acceptor 55. The processing unit 72 receives input from and essentially controls the payment module 26 (the various components thereof) via software (program instructions) stored in memory 74. Additionally, the processing unit is in communication with the receipt printer 54, the security scale 42, the scanner 30, the product scale 32, the EAS detector 70, the notification light/pager 66/68, and the terminal 58 including the display 60 and touch screen 61. The processing unit 72 is also in communication with memory 74. The memory 74 is operative to store program instructions for operation of the various components of the SCOT 12. The EAS deactivator 18 is shown in dashed line and the connection to the processing unit 72 to indicate that the EAS deactivator 18 is only in communication with the processing unit 72 when the EAS deactivator 18 is an active device. An active EAS deactivator 18 constitutes an EAS deactivator 18 that can be turned on and off.

Figure 4:
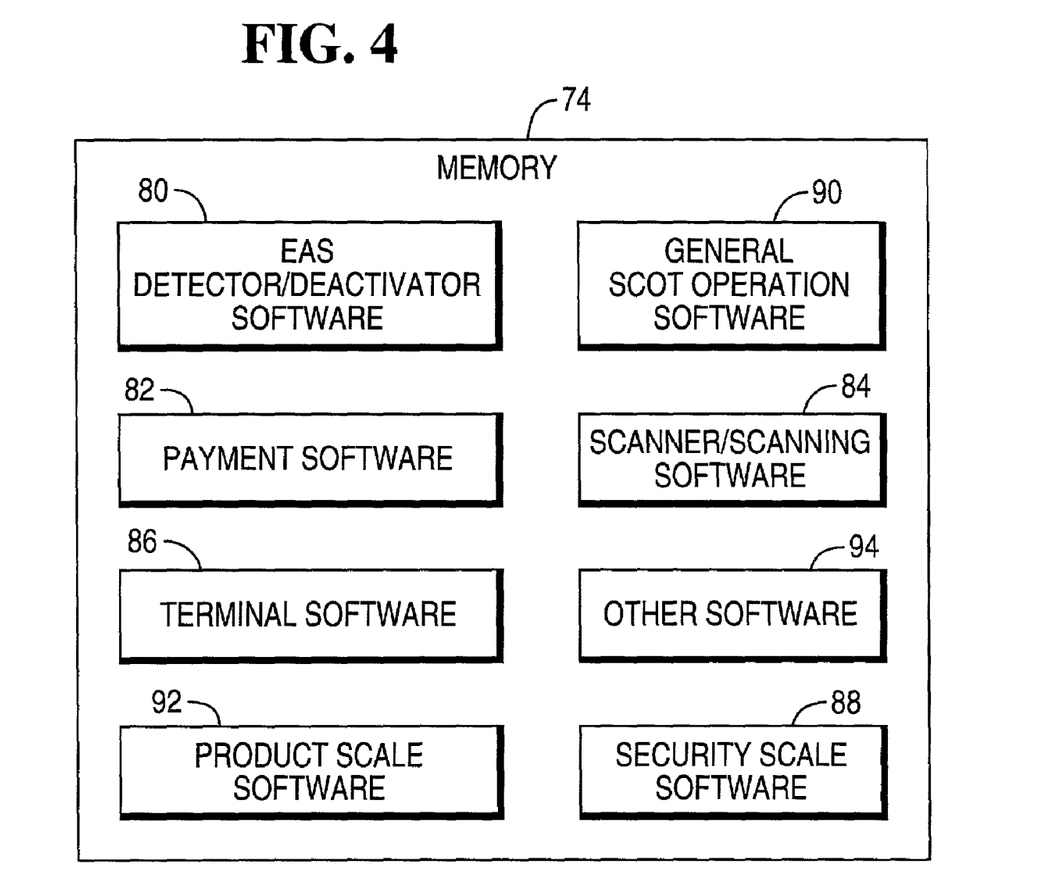
FIG. 4 is a block diagram of the memory of the self checkout of FIG. 2 illustrating the various software stored therein.

Referring additionally to FIG. 4, the memory 74 contains a plurality of software applications (program instructions) for particular aspects of the SCOT 12. In particular, the memory 74 contains EAS detector/deactivator software 80, payment software 82, scanner/scanning software 84, terminal software 86, security scale software 88, general SCOT operation software 90, product scale software 92, and other software 94 (encompassing all other software necessary to operate the SCOT 12 and/or perform all necessary functions thereof not specifically mentioned). All of the software is operative to operate in conjunction with all of the other software to the extent necessary to interact with the various components of the SCOT in order to accomplish the required objectives.

The EAS detector/deactivator software 80 is operative to allow control of the operation and/or functionality of the EAS detector 70 and the EAS deactivator 18 if the EAS deactivator 18 is an active device. Particularly, the EAS detector/deactivator software 80 is operative to receive signals from the EAS detector 70 indicative that an EAS tag has been detected or sensed during the scanning operation, within the itemization area 22, or during the bagging operation as detailed below. The EAS detector/deactivator software 80 is further operative to pause, stop, or temporarily cease further operation of the SCOT 12 when an EAS tag sensed signal is produced until the EAS tag has been deactivated. In the case where the EAS deactivator 18 is an active device, the EAS detector/deactivation software 80 is operative to turn on or activate the EAS deactivator 18 after an EAS tag sensed signal is produced. The EAS deactivator 18 may then turn off the EAS deactivator 18 after a certain amount of time or after a predetermined criteria or event has elapsed or occurred.

The payment software 82 is operative to allow control of the operation and/or functionality of the various components of the payment module 26 and control of the operation and/or functionality of the electronic payment terminal 44. In the case of payment for the purchase in cash or currency, the payment software 82 is operative to allow the collection of currency via either or both the bill acceptor 50 and/or the coin acceptor 46. In the case of payment by credit card, debit card, smart card, store card, or the like, the payment software 82 is operative to allow the collection of data from the card via the electronic payment terminal 44, obtain any necessary authorization, and conclude the transaction.

The payment software 82 is also operative to control the coupon acceptor 55 and calculate the total amount due for the particular purchase transaction with or without coupons. The receipt printer 54 is under control of the payment software to provide a paper receipt of the purchase transaction. Alternately or in addition to the paper receipt, the SCOT 12 may compile a digital receipt.

The scanner/scanning software 84 is operative to control the operation and/or functionality of the scanner 30. This includes operation of the mechanics of the scanner 30 as well as the reading of the product codes/data from an item or product, and any necessary correlations (i.e. database lookups and the like) of data regarding the product to process the purchase transaction.

The terminal software 86 is operative to drive or operate the terminal 58 including the display 60 and touch screen 61 as appropriate, as well as obtain information input to the SCOT 12 via the terminal 58 (i.e. the display 60 or touch screen 61). When the terminal 58 is in a signature capture mode, the terminal software 86 is operative to obtain the signature input on the touch screen 61, digitize the obtained signature, and process the obtain digital signature as appropriate.

The security scale software 88 is operative to drive or operate the security scale 42. In particular, the security scale software 88 is operative to obtain a weight of a bag and its contents after an item has been scanned and/or an EAS tag has been deactivate (or within a time period within which an EAS tag should have been deactivated). The bag weight is used to correlate the item scanned with the item bagged.

The product scale software 92 is operative to drive or operate the product or produce scale 32. In particular, the product scale software 92 is operative to obtain a weight of an item such as produce when placed thereon. This is typically accomplished when the SCOT 12 is in a purchase transaction mode. The product scale software also provides a trigger signal for the camera driver software 80 for the camera 70 to obtain a digital picture at the time of stable weight of the produce on the scale 32. That is, when the produce on the scale 32 is stable, the weight as measured by the scale 32 will not fluctuate (or fluctuate within a small amount), thus providing a stable weight measurement. At this time, the customer will not typically be in line with the camera 70. Therefore, the camera 70 can obtain an unobstructed digital picture of the produce at the time of stable weight.

The general SCOT operation software 90 and the other software 94 are operative to provide all other operations and/or functionality of the SCOT 12 not specifically mentioned with respect to the other software, but necessary and/or appropriate for operation of the SCOT 12.

Figure 5:
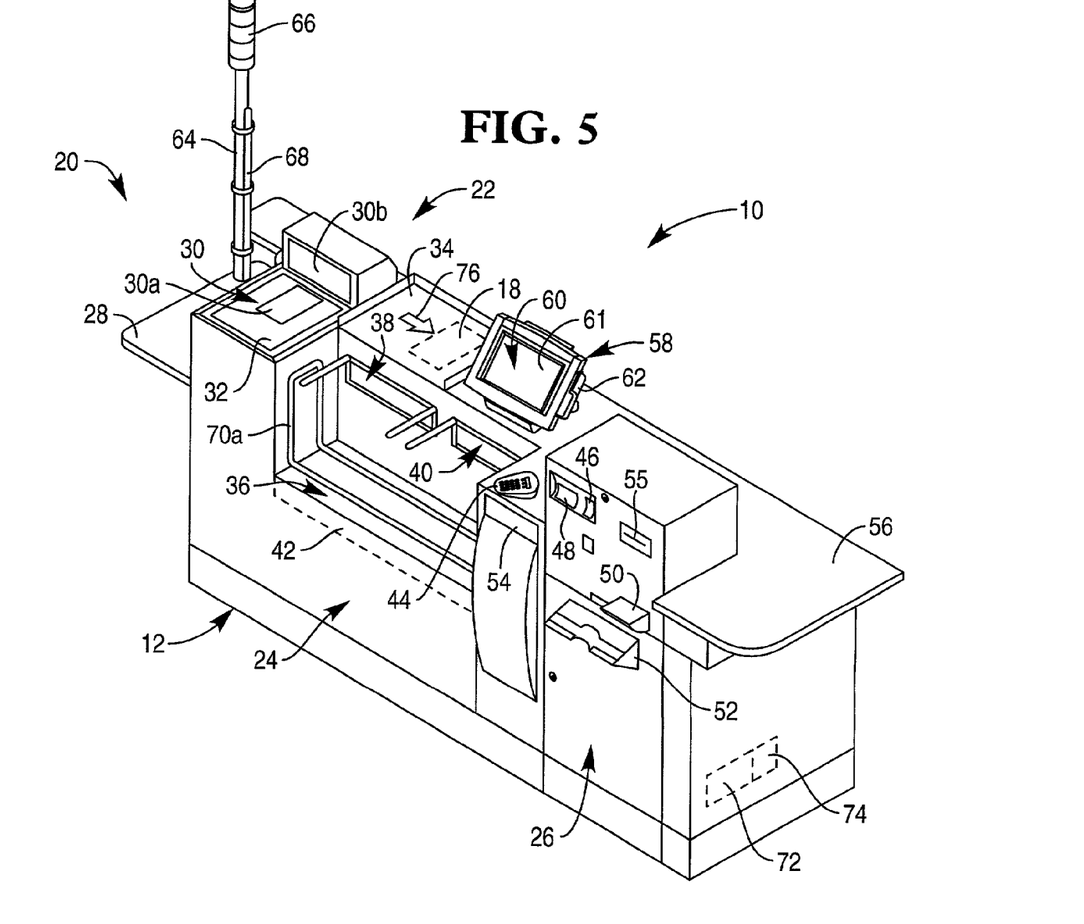
FIG. 5 is a perspective view of another exemplary self checkout embodying the subject invention.

Referring to FIG. 5, there is depicted the SCOT 12 incorporating another embodiment of the EAS detector 70a. The EAS detector 70a, functions and/or operates in the same manner as the EAS detector 70, but is disposed around or proximate the bagwell 36 and/or security scale 42, rather than around or proximate the scanner 30. Thus, as the consumer moves the scanned item to a bag (to the bagwell), the EAS detector 70a will detect whether the item has an activated or active EAS tag. The SCOT 12 will then direct the customer to deactivate the EAS tag via the EAS deactivator or deactivator area 18. The SCOT 12 will also preferably pause operation, with the exception of the EAS deactivator 18. With this embodiment, if the EAS tag is not properly deactivated, placing the item with the EAS tag back into the bag (or the bagwell 36) will cause the SCOT 12 to direct the customer to again deactivate the EAS tag. This procedure may cycle a predetermined number of times before assistance is summoned.

In accordance with another embodiment of the subject invention but not shown, the SCOT 12 may utilize two EAS detectors, namely the EAS detector 70 of FIG. 2 and the EAS detector 70a of FIG. 5. The detection strength of each EAS detector would be adjusted accordingly so as not to interfere with the detection of an EAS tag by the other. In particular, in this embodiment the EAS detector 70 would be used for initial detection of an EAS tag during scanning, while the EAS detector 70a would be used for post deactivation of the EAS tag. More particularly, the first EAS detector 70 would detect whether an EAS tag is present in the article or item being scanned and direct the customer to deactivate the EAS tag after the scanning process. Scanning would preferably cease in order to allow the customer time to deactivate the EAS tag. When the customer places the item having the EAS tag into the bagwell 36, the security scale 36 would then register that an item has been placed therein and the second EAS detector 70a would be activated to determine whether the EAS deactivation process or procedure was successful. If the second EAS detector 70a sensed an active EAS tag, the customer would be directed to deactivate the EAS tag. Assistance may be called if the process is repeated with the same item with no customer success of deactivating the EAS tag.

Of course, it should be appreciated that the placement of both the EAS detector 70 and the EAS deactivator may be located in different positions on the SCOT 12 than those shown and/or described as long as the principles of the subject invention are maintained. As well, variations of the above are contemplated.

Figure 6:
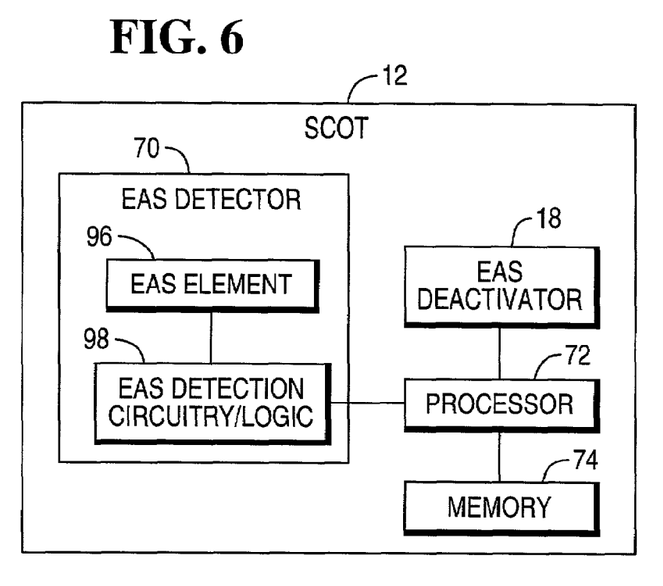
FIG. 6 is a block diagram of another exemplary self checkout embodying an aspect of the subject invention.

Referring to FIG. 6, the EAS detector 70 may consist of an EAS element 96 such as a coil or the like, and appropriate EAS detection circuitry/logic 98. The EAS element 96 is adapted/configured to be coupled to and/or in communication with the EAS detection circuitry/logic 98. The EAS detection circuitry/logic 98 is in communication with the processor 72. According to an aspect of the subject invention or as an embodiment of the subject invention, the EAS element 96 may be provided as an add-on component that is mountable to the SCOT 12 in the manner set forth above, or in another appropriate location. Further, the EAS detection circuitry/logic 98 may be provided as an add-on component or module that is "pluggable" into the existing SCOT 12 through a port or the like. The EAS detection circuitry/logic 98 as a module may thus include memory storing the appropriate software to operate the EAS element 96, the EAS detector circuitry/logic 98, and/or the SCOT 12. Thus, in this manner existing SCOTs may be retrofitted with the appropriate hardware to provide the subject EAS system.

OPERATION

Figure 7:
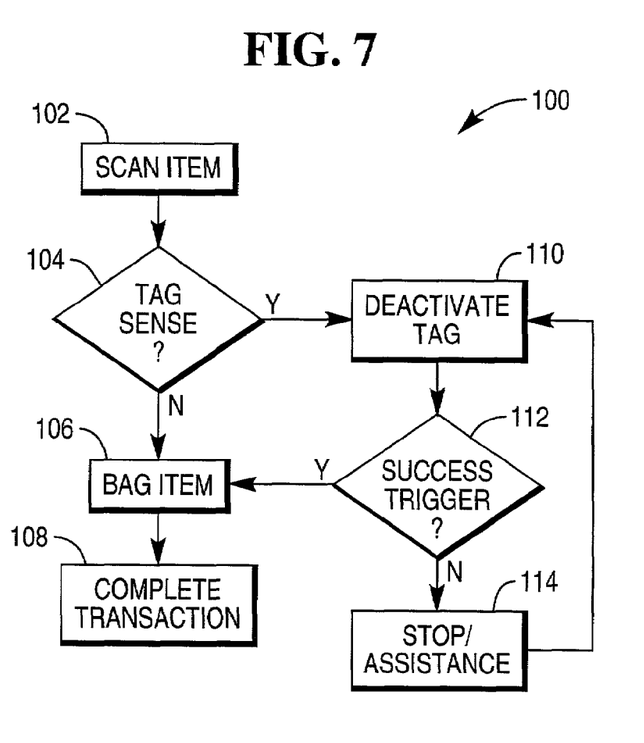
FIG. 7 is a flowchart of an exemplary manner of operation of the subject invention.

Referring to FIG. 7, there is depicted a flow chart, generally designated 100, of an exemplary manner of operation of an aspect of the subject invention. In particular, there is depicted the flow chart 100 of an exemplary manner of EAS monitoring (detection and/or deactivation). It should be appreciated that the manner of operation described below in conjunction with the flow chart 100 is only an example of one manner or mode in which the SCOT 12 may implement the subject invention.

In step 102, a customer begins the checkout transaction by scanning an item by the scanner 30. In step 104, during or after the scanning of the item the EAS detector senses whether the item has an EAS tag. If the item does not have an EAS tag ("NO"), then the customer is permitted to bag the item, step 106. Thereafter, in step 108, the purchase transaction is completed. If in step 104, it is determined by the EAS detector that the item has an EAS tag ("YES"), the customer is directed to deactivate the EAS tag, step 110. In step 112 it is determined whether the EAS tag deactivation process was a success (providing a success trigger signal). If EAS tag deactivation has been successful ("YES"), then the customer is permitted to bag the item, step 106, then complete the transaction, step 108. If, however, EAS tag deactivation has not been successful ("NO" in step 112), the SCOT 12 stops and/or asks for assistance. In both cases, there is a further attempt to deactivate the EAS tag, step 110, wherein the process continues until either the EAS tag is deactivated, or other assistance measures are provided.

Figure 8:
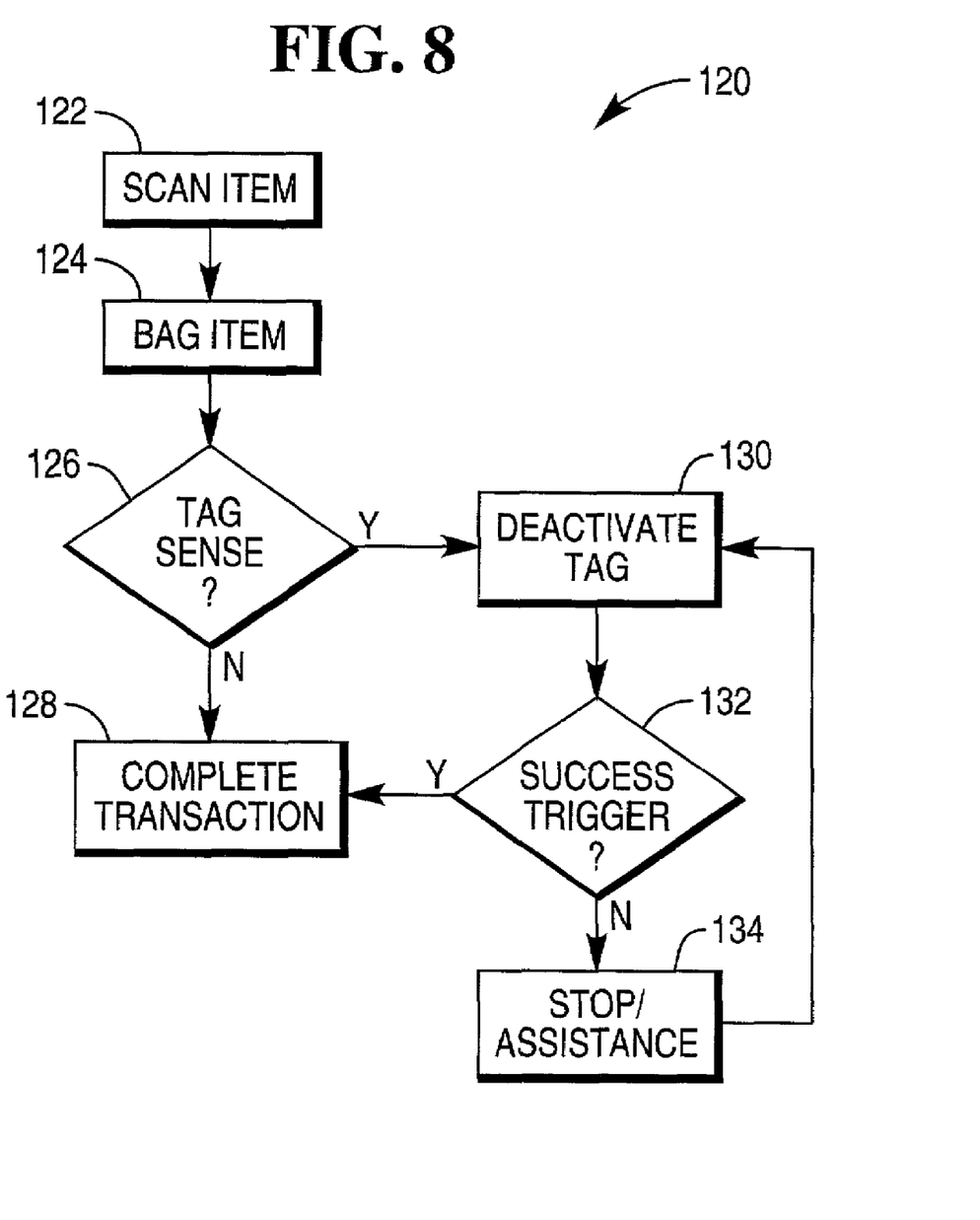
FIG. 8 is a flowchart of another exemplary manner of operation of the subject invention.

In FIG. 8, there is depicted another exemplary manner of operation of the subject invention. In particular, there is depicted the flow chart 120 of another exemplary manner of EAS monitoring (detection and/or deactivation). It should be appreciated that the manner of operation described below in conjunction with the flow chart 120 is only another example of another manner or mode in which the SCOT 12 may implement the subject invention.

In step 122, a customer begins the checkout transaction by scanning an item by the scanner 30. After the item is scanned, the customer bags the item, step 124. During the bagging of the item the EAS detector determines or senses whether there is an EAS tag associated with the item, step 126. If there is no EAS tag associated with the item ("NO"), then the purchase transaction may be completed, step 128. If, however, there is an EAS tag detected ("YES"), then the customer is directed to deactivate the EAS tag, step 130. In step 132 it is determined whether the EAS tag deactivation process was a success (providing a success trigger signal). If EAS tag deactivation has been successful ("YES"), then the customer is permitted to complete the transaction, step 128. If, however, EAS tag deactivation has not been successful ("NO" in step 132), the SCOT 12 stops and/or asks for assistance. In both cases, there is a further attempt to deactivate the EAS tag, step 130, wherein the process continues until either the EAS tag is deactivated, or other assistance measures are provided.

Figure 9:
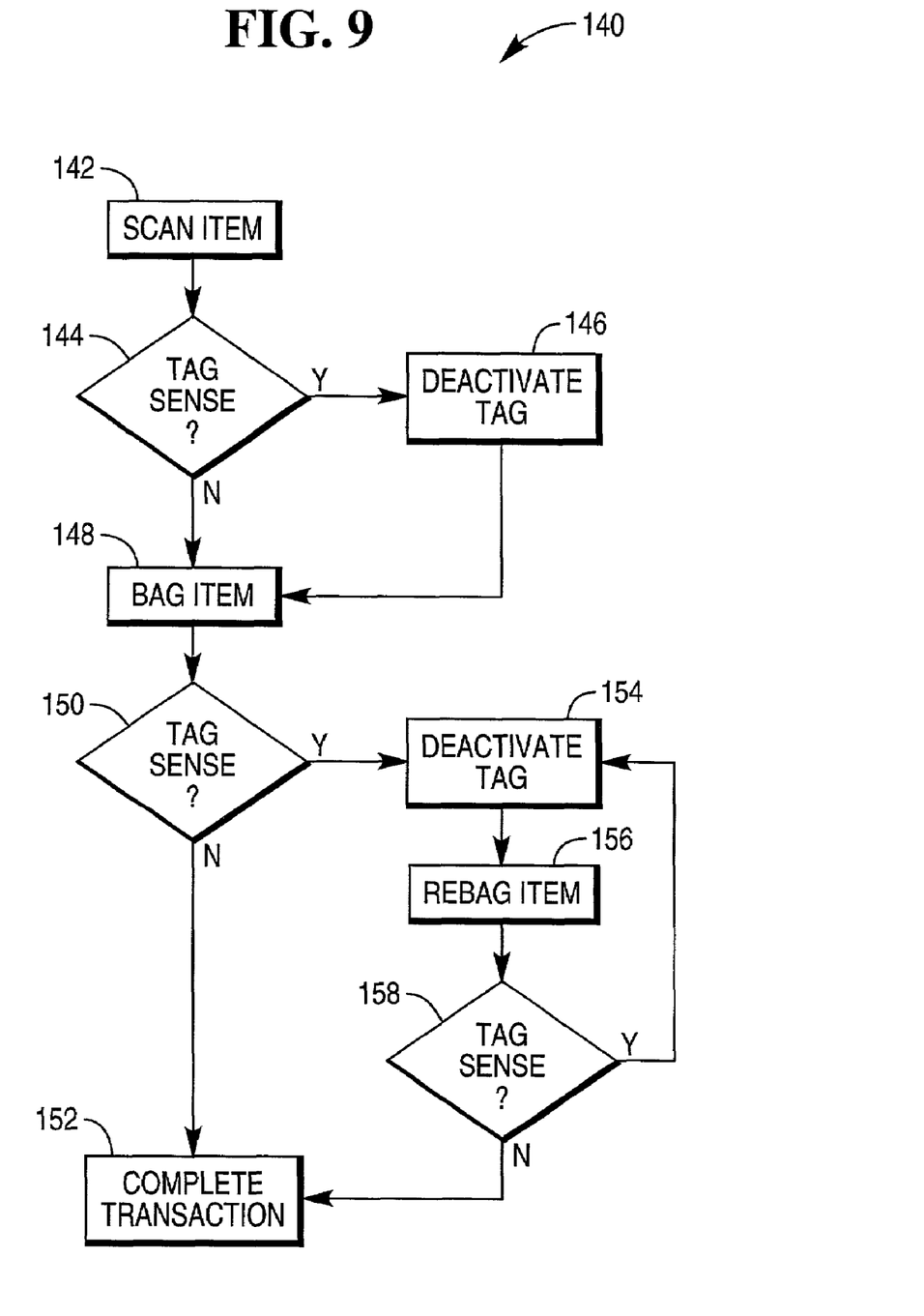
FIG. 9 is a flowchart of another exemplary manner of operation of the subject invention.

In FIG. 9, there is depicted yet another exemplary manner of operation of the subject invention. In particular, there is depicted the flow chart 140 of an exemplary manner of EAS monitoring (detection and/or deactivation). It should be appreciated that the manner of operation described below in conjunction with the flow chart 140 is only an example of one manner or mode in which the SCOT 12 may implement the subject invention.

In step 142, a customer begins the checkout transaction by scanning an item by the scanner 30. In step 144, during or after the scanning of the item the first EAS detector senses whether the item has an EAS tag. If the item does not have an EAS tag ("NO"), then the customer is permitted to bag the item, step 148. If in step 144, it is determined by the first EAS detector that the item has an EAS tag ("YES"), the customer is directed to deactivate the EAS tag, step 146. Thereafter, the customer then bags the item, step 148.

During the bagging of the item, step 148, or substantially immediately thereafter, the second EAS detector determines whether the EAS tag has been deactivated. If the EAS tag has been deactivated ("NO"), the customer is permitted to complete the purchase transaction, step 152. If, however, the EAS tag has not been deactivated ("YES"), the customer is again directed to deactivate the EAS tag 154. Thereafter, the customer rebags the item, step 156. Again, during the rebagging of the item, step 156, or substantially immediately thereafter, the second EAS detector determines whether the EAS tag has been deactivated. If the EAS tag has been deactivated ("NO"), the customer is permitted to complete the purchase transaction, step 152. If, however, the EAS tag has not been deactivated ("YES"), the customer is again directed to deactivate the EAS tag 154. After some point (i.e. after a predetermined number of "rebags"), assistance is provided.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

What is claimed is:

1. A method of operating a checkout terminal The comprising:
scanning an item with a scanner;
determining that the scanned item has an electronic article surveillance tag;
allowing, after the step of determining, deactivation of the electronic article with an active electronic article surveillance tag deactivator;
disabling the scanner from scanning other items based upon the step of determining: and
activating an indicia identifying the location of the active electronic article surveillance tag deactivator.

2. The method of claim 1, wherein determining that the scanned item has an active electronic article surveillance tag includes utilizing an electronic article surveillance detector.

3. The method of claim 2, wherein utilizing an electronic article surveillance detector, includes utilizing an electronic article surveillance detector that is associated with the scanner.

4. The method of claim 1, further comprising determining whether the electronic article surveillance tag has been deactivated after the step of allowing deactivation of the active electronic article surveillance tag.

5. The method of claim 4, wherein of determining whether the electronic article surveillance tag has been deactivated includes the step of utilizing a second electronic article surveillance detector.

6. The method of claim 5, wherein of utilizing a second electronic article surveillance detector, includes utilizing a second electronic article surveillance detector that is associated with a bagwell of a self checkout terminal.

7. The method of claim 5, wherein utilizing a second electronic article surveillance detector, includes utilizing a second electronic article surveillance detector that is associated with a security scale of a self checkout terminal.

8. A method of operating a checkout terminal The comprising:
scanning an item with a scanner;
determining that the scanned item has an electronic article surveillance tag;
allowing, after the step of determining, deactivation of the electronic article;
disabling the scanner from scanning other items based upon the step of determining; and
indicating that an intervention is needed if the electronic article surveillance tag has not been deactivated within a predetermined time of allowing the deactivation.

9. The method of claim 8, wherein the determining comprises determining that the item has an electronic article surveillance tag with a first electronic article surveillance tag detector.

10. The method of claim 9, further comprising:
verifying, with a second electronic article surveillance tag detector, that the electronic article surveillance tag has been deactivated.

11. The method of claim 8, wherein the disabling comprises disabling the scanner from scanning other items until the electronic article surveillance tag has been deactivated.

12. A method of operating a checkout terminal The comprising:
scanning an item with a scanner:
determining that the scanned item has an electronic article surveillance tag;
allowing, after the step of determining, deactivation of the electronic article;
disabling the scanner from scanning other items based upon the step of determining; and
detecting the electronic article surveillance tag with an electronic article surveillance tag detector located in a bagging area of the terminal; and
indicating that an intervention is needed if the electronic article surveillance tag has not been deactivated within a predetermined time of allowing the deactivation.

13. The method of claim 12, wherein the determining comprises determining that the item has an electronic article surveillance tag with a first electronic article surveillance tag detector.

14. The method of claim 13, further comprising:
verifying, with a second electronic article surveillance tag detector, that the electronic article surveillance tag has been deactivated.

15. The method of claim 12, wherein the disabling comprises disabling the scanner from scanning other items until the electronic article surveillance tag has been deactivated.

16. A self checkout comprising:
a processor;
a scanner in communication with the processor;
an electronic article surveillance detector in communication with the processor;
an electronic article surveillance deactivator; and
a memory in communication with the processor and storing program instructions which, when executed by the processor, causes the processor to: (a) allow scanning of an item for purchase via the scanner, (b) determine, after successful scanning of the item, whether the item has an active electronic article surveillance tag via the electronic article surveillance detector, (c) allow deactivation of the active electronic article surveillance tag after determining that the item includes an electronic article surveillance tag, and (d) generate an indication that an intervention is needed if the electronic article surveillance tag has not been deactivated within a predetermined time of allowing the deactivation.

17. The self checkout of claim 16, wherein the electronic article surveillance detector is associated with the scanner.

18. The self checkout of claim 16, further comprising a second electronic article surveillance detector, and the memory has further program instructions which, when executed by the processor, causes the processor to determine via the second article surveillance detector whether the electronic article surveillance tag has been deactivated by the electronic article surveillance deactivator.

19. The self checkout of claim 18, wherein the second electronic article surveillance detector is associated with a bagwell of the self checkout.

20. The self checkout of claim 18, wherein the second electronic article surveillance detector is associated with a security scale of the self checkout.

21. The self checkout of claim 16, wherein the electronic article surveillance detector comprises a coil and electronic circuitry/logic, and the memory has further program instructions which, when executed by the processor, causes the processor to cause the electronic circuitry/logic obtain a signal from the coil indicative of the active electronic article surveillance tag.

22. The self checkout of claim 21, wherein the coil and electronic circuitry/logic are modular.

* * * * *

UNITED STATES PATENT AND TRADEMARK OFFICE
CERTIFICATE OF CORRECTION

PATENT NO. : 7,389,918 B2 Page 1 of 1
APPLICATION NO. : 10/001389
DATED : June 24, 2008
INVENTOR(S) : Charles K. Wike, Jr. et al.

It is certified that error appears in the above-identified patent and that said Letters Patent is hereby corrected as shown below:

Column 13, Line 17, after "terminal" delete "The"

Column 13, Line 52, after "terminal" delete "The"

Column 14, Line 12, after "terminal" delete "The"

Signed and Sealed this

Thirtieth Day of September, 2008

JON W. DUDAS
*Director of the United States Patent and Trademark Office*